(12) United States Patent
Shinohara (10) Patent No.: US 10,425,790 B2
(45) Date of Patent: Sep. 24, 2019

(54) SENSOR DEVICE, SENSOR NETWORK SYSTEM, AND DATA COMPRESSING METHOD

(71) Applicant: ROHM CO., LTD., Ukyo-Ku, Kyoto (JP)

(72) Inventor: Toshikuni Shinohara, Kyoto (JP)

(73) Assignee: ROHM CO., LTD., Ukyo-Ku, Kyoto (JP)

(*) Notice: Subject to any disclaimer, the term of this patent is extended or adjusted under 35 U.S.C. 154(b) by 330 days.

(21) Appl. No.: 15/395,066

(22) Filed: Dec. 30, 2016

(65) Prior Publication Data
US 2017/0195823 A1 Jul. 6, 2017

(30) Foreign Application Priority Data
Jan. 5, 2016 (JP) ................. 2016-000541

(51) Int. Cl.
*G06F 15/173* (2006.01)
*H04W 4/70* (2018.01)
*H04L 29/08* (2006.01)
*H04W 88/16* (2009.01)

(52) U.S. Cl.
CPC ............ *H04W 4/70* (2018.02); *H04L 67/12* (2013.01); *H04W 88/16* (2013.01)

(58) Field of Classification Search
CPC .......... H04W 4/70; H04W 88/16; H04L 67/12
See application file for complete search history.

(56) References Cited

U.S. PATENT DOCUMENTS

2008/0071465 A1* 3/2008 Chapman ........... G01C 21/3691
701/117
2015/0151160 A1* 6/2015 Balakrishnan .......... G01P 13/00
700/91

FOREIGN PATENT DOCUMENTS

JP 2010049584 A 3/2010

* cited by examiner

*Primary Examiner* — John B Walsh
(74) *Attorney, Agent, or Firm* — Cantor Colburn LLP (57) ABSTRACT

A sensor device includes: a sensor element configured to detect a physical quantity in a time-series manner; a data processing part configured to perform filtering on time-series data detected during a predetermined period by the sensor element to extract time-series data having a predetermined frequency component, and compare the extracted time-series data with a predetermined threshold value to determine one or a plurality of significant sections within the predetermined period, the extracted time-series data exceeding the threshold value in each of the significant sections; and a communication part configured to arrange and wirelessly transmit time-series data of each of the significant sections among the time-series data detected during the predetermined period by the sensor element.

6 Claims, 11 Drawing Sheets

SENSOR DEVICE, SENSOR NETWORK SYSTEM, AND DATA COMPRESSING METHOD

CROSS-REFERENCE TO RELATED APPLICATION

This application is based upon and claims the benefit of priority from Japanese Patent Application No. 2016-000541, filed on Jan. 5, 2016, the entire contents of which are incorporated herein by reference.

TECHNICAL FIELD

The present disclosure relates to a sensor device and a sensor network system for collecting data detected by the sensor device. Further, the present disclosure relates to a data compressing method of compressing data detected by a sensor.

BACKGROUND

A wireless sensor network (WSN) (hereinafter, also referred to simply as a "sensor network") is a communication network including a wireless terminal (which is referred to as a "sensor node") having a plurality of sensors and is used to collect information from each sensor node. In the WSN, a communication scheme such as ZigBee®, EnOcean®, Wi-SUN®, or Bluetooth® low energy (BLE) is used.

Data transmitted from each sensor node is relayed by a relay, and then transmitted to a higher calculator such as a server or the like. The higher calculator executes various processing based on data received from a plurality of sensor nodes.

In the sensor network, it is preferred that each sensor node can operate without requiring an external power source. Thus, generally, each sensor node is configured to operate intermittently to consume less power. The intermittent operation refers to driving a peripheral device such as a sensor and a communication device only when a task is executed.

Meanwhile, in order to detect abnormality of a monitoring target, a plurality or sensors are required to operate constantly. In a situation where the plurality of sensors constantly operate in this way, a problem of securing a communication power in use, a problem of securing a radio band to transmit a huge amount of data, and the like may arise. Thus, a reduction in an amount of data to be transmitted is an essential task.

In the related art, a sensor network system is provided which is also capable of securing a communication band of a wireless network, while having a plurality of sensor nodes for measuring data having a high sampling rate. Specifically, a sensor node in the related art calculates a feature quantity from an observation value obtained during a predetermined observation period and determines whether the feature quantity thus calculated exceeds a predetermined threshold value. The sensor node transmits the observation value obtained during the predetermined observation period to a server only when the feature quantity exceeds the predetermined threshold value. Here, the feature quantity refers to a quantity obtained by digitizing features of the observation value, and also to a quantity that may be used as a standard of judgment. Single data or a plurality of data having a data amount smaller than a plurality of observation values are calculated using the plurality of observation values and used as feature quantities in the related art.

In the related art mentioned above presents only an example as to how a feature quantity is actually calculated. Specifically, in the related art, the sensor node includes a 3-axis accelerometer as a vibration sensor for analyzing stress of a structure, and a power value corresponding to a first natural frequency in a power spectrum is used as a feature quantity. However, in an actual calculation, a 2-square average value of acceleration of the original temporal signal (i.e., of the entire frequency domain) is simply calculated as an approximate value in the related art. As mentioned above, in the related art, since only the power value (actually, an overall power value of a predetermined period) at the first natural frequency is utilized as a feature quantity, the method is not considered to be appropriate for a case where another feature is more important, for example, in a case where it is intended to focus on a change in the power value over time at a predetermined frequency (a high-order natural frequency or the like).

Further, in the related art, it is difficult for a feature quantity to exceed a threshold value due to a short waveform or the like for an observation period, causing a difficulty in detecting a waveform. Since abnormal vibrations or the like have a pulse shape in many cases, a transmission period should be set shorter in order to detect such vibrations. However, there is a possibility of increasing communication frequency and generating communication interference with another sensor and this also makes it difficult to secure an intended radio band. Moreover, when the feature quantity frequently exceeds the threshold value, it is difficult to acquire the effect of reducing a communication amount. As another method to solve this problem, a sensor node that frequently performs a threshold value determination is considered. However, since a state such as chattering (a state where a feature quantity frequently exceeds a threshold value) occurs depending on signals, there is a possibility of performing high frequency transmission, a great amount of electric power is consumed in the sensor node and a communication failure occurs. As a result, it is not suitable for a wireless sensor node.

SUMMARY

The present disclosure provides some embodiments of a data compressing method of compressing data by recognizing a section including a characteristic signal fluctuation based on data detected by a sensor, and a sensor device and a sensor network system capable of reducing a communication amount by transmitting the compressed data using the data compressing method. Other problems and novel features will become apparent from the description of the present disclosure and the accompanying drawings.

According to one embodiment of the present disclosure, there is provided a sensor device, including: a sensor element configured to detect a physical quantity in a time-series manner, a data processing part, and a communication part. The data processing part is configured to perform filtering on time-series data detected during a predetermined period by the sensor element to extract time-series data having a component of a predetermined frequency, and compare the extracted time-series data with a predetermined threshold value to determine one or a plurality of significant sections within the predetermined period. The extracted time-series data exceeds the threshold value in each of the significant sections. The communication part is configured to arrange and wirelessly transmit time-series data of each of the significant sections among the time-series data detected during the predetermined period by the sensor element.

With this configuration, since only a portion of the time-series data in which signal strength is greatly fluctuated is considered as a significant section and only the time-series data of the significant section is transmitted, it is possible to reduce a communication amount of the sensor device.

According to another embodiment of the present disclosure, there is provided a sensor device, including: a sensor element configured to detect a physical quantity in a time-series manner; a data processing part, and a communication part. The data processing part is configured to Fourier-transform time-series data detected during a predetermined period by the sensor element for each set time frame to extract a plurality of feature quantities representing features of an obtained spectrum. Further, the data processing part is configured to determine whether a relationship between the plurality of feature quantities satisfies a predetermined reference to determine one or a plurality of significant sections within the predetermined period. The relationship between the plurality of feature quantities satisfies the reference in each of one or plurality of time frames corresponding to each of the significant sections. The communication part is configured to arrange and wirelessly transmit time-series data of each of the significant sections among the time-series data detected during the predetermined period by the sensor element.

With this configuration, by setting the significant section based on a fluctuation in a characteristic portion of a spectrum obtained from the time-series data, only the characteristic portion of the time-series data can be transmitted. Thus, it is possible to reduce a communication amount of the sensor device.

According to one embodiment or another embodiment of the present disclosure, the data processing part may be configured to extend a time width of each of the significant sections by advancing a start point of each of the significant sections and delaying an end point thereof. The communication part is configured to wirelessly transmit the time-series data of each of the significant sections using the entirety including a portion increased by extending the time width for each of the significant sections as one significant section.

With this configuration, in a case where a fluctuation in a signal detected by the sensor element is temporarily discrete, it is possible to more completely extract a fluctuation of each signal.

If a plurality of adjacent significant sections obtained by extending the time width of each of the significant sections overlap, the data processing part is configured to arrange the plurality of adjacent significant sections and handle the same as one significant section.

With this configuration, in a case where a signal detected by the sensor element is intensely fluctuated, it is possible to reduce the number of sections to transmit the data.

The communication part is configured to arrange and wirelessly transmit the time-series data of each of the significant sections together with information representing the time corresponding to each of the significant sections.

According to another embodiment of the present disclosure, there is provided a sensor network system, including: a plurality of sensor devices as mentioned above; and a gateway device configured to wirelessly communicate with each of the sensor devices.

According to another embodiment of the present disclosure, there is provided a data compressing method, including: performing filtering on time-series data detected by a sensor element during a predetermined period using a processor to extract time-series data having a component of a predetermined frequency; and comparing the extracted time-series data with a predetermined threshold value to determine one or a plurality of significant sections within the predetermined period using the processor. The extracted time-series data exceeds the threshold value in each of the significant sections. The data compressing method further includes extracting only time-series data of each of the significant sections among the time-series data detected by the sensor element during the predetermined period using the processor.

DETAILED DESCRIPTION

Embodiments of the present disclosure will now be described with reference to the drawings. Further, the same reference numerals are used for the same or corresponding parts and a description thereof will be not repeated.

First Embodiment

[Configuration of Sensor Network]

Figure 1:
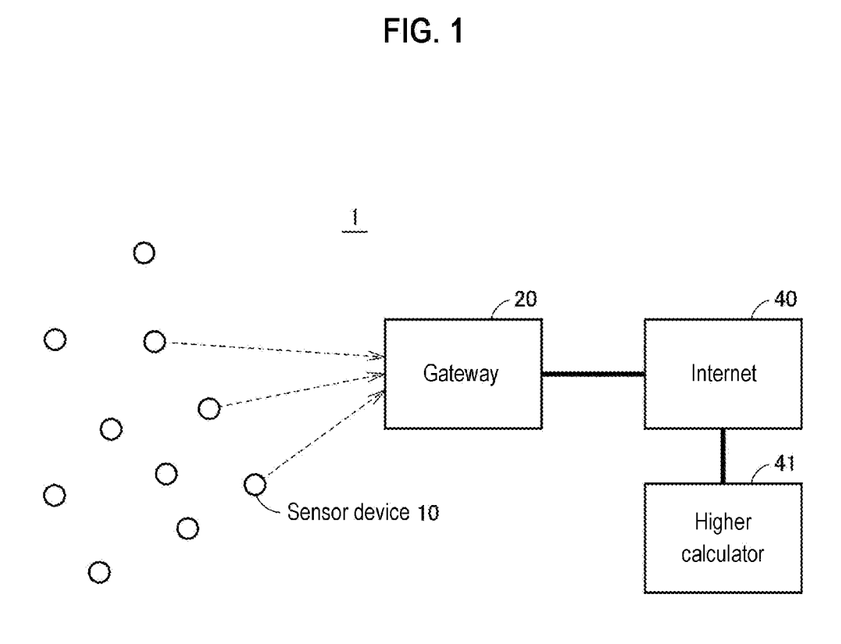
FIG. 1 is a block diagram illustrating a schematic configuration of a wireless sensor network system.

FIG. 1 is a block diagram illustrating a schematic configuration of a wireless sensor network system. The wireless sensor network system (also referred to as a "sensor network system" herein) 1 includes a plurality of sensor devices 10 and a gateway device 20. The sensor device 10 is also referred to as a sensor node, and the gateway device 20 is also referred to as a control node.

Each of the sensor devices 10 includes a sensor element for detecting an ambient physical quantity or the like in a time-series manner. Each of the sensor devices 10 is configured as a wireless communication terminal for transmitting information based on time-series data detected by the sensor element. A communication scheme such as ZigBee®, EnOcean®, Wi-SUN®, or BLE (Bluetooth® Low Energy (BLE) is used for communication between each of the sensor devices 10 and the gateway device 20.

The sensor network system features that each of the sensor devices 10 determines a significant section on a time axis based on the time-series data and transmits only time-series data within the significant section, in order to reduce a communication amount. A specific method of determining a significant section will be described later.

Each of the sensor devices 10 may have a relay routing function to transmit transmission data from another sensor device 10 to the gateway device 20. Further, each of the sensor devices 10 may have an ad-hoc function to directly communicate with each other. In addition, the plurality of sensor devices 10 that constitute a sensor network may constitute a tree network or a mesh network.

The gateway device 20 receives data transmitted from each of the plurality of sensor devices 10 and transmits the received data to a higher calculator (a personal computer, a server, a cloud, etc.) 41 via a network 40 such as the Internet. Further, the gateway device 20 receives a control command, setting information, and the like regarding each sensor device 10 from the higher calculator 41 via the network 40. The gateway device 20 may also have a function of storing and/or calculating the received data, as well as simply relaying the data transmitted from each sensor device 10. A wired local area network (LAN), Wi-Fi®, Bluetooth®, or the like is used for communication between the gateway device 20 and the higher network 40.

[Hardware Configuration of Sensor Device]

Figure 2:
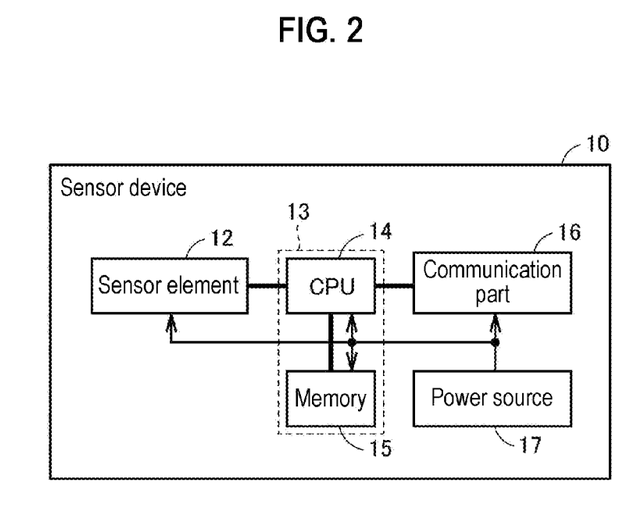
FIG. 2 is a block diagram illustrating an example of a hardware configuration of a sensor device of FIG. 1.

FIG. 2 is a block diagram illustrating an example of a hardware configuration of the sensor device of FIG. 1. Referring to FIG. 2, the sensor device 10 includes a sensor element 12, a central processing unit (CPU) 14, a memory 15, a communication part 16, and a power source 17. A micro control unit (MCU) 13 may also be configured to include the CPU 14, the memory 15, and other peripheral devices (not shown).

The sensor element 12 detects a physical quantity of a monitoring target in a time-series manner. The type of the sensor element 12 is not particularly limited, and the present disclosure is applicable to any sensor element as long as it detects some physical quantities. For example, various sensors such as a magnetic sensor, an electric field sensor, a current sensor, a voltage sensor, a pressure sensor, a flow sensor, a temperature sensor, an illumination sensor, and a humidity sensor, in addition to an accelerometer, a gyro sensor, a sound sensor (microphone, etc.), may be used as the sensor element 12. Further, the present disclosure is appropriately applied to an application in which the sensor element should not be operated intermittently but constantly operated. In addition, in FIG. 2, only one sensor element 12 is illustrated but a plurality of sensor elements may be installed in the sensor device 10.

A physical quantity detected in a time-series manner by the sensor element 12 (hereinafter, referred to as "time-series data") is temporarily stored in the memory 15. In a case where the sensor element 12 is configured to output an analog signal, the output signal from the sensor element 12 is filtered, and converted into digital data by an analog-to-digital converter (A/D converter) (not shown), and then stored in the memory 15.

The CPU 14 serves as a data processing part for performing calculation processing using the time-series data detected by the sensor element 12 and stored in the memory 15. Specifically, the CPU 14 performs filtering (low pass, band pass, high pass filtering or the like) on time-series data detected by the sensor element 12 to extract time-series data having a component of a predetermined frequency, and compare the extracted time-series data with a predetermined threshold value to determine a significant section of the time axis. Here, the extracted time-series data having the component of the predetermined frequency exceeds the threshold value in the determined significant section. A specific example of the data processing by the CPU 14 will be described later.

The communication part 16 wirelessly transmits only data of the significant section, among the time-series data detected by the sensor element 12, to the gateway device 20. For the wireless communication, a communication scheme such as the aforementioned ZigBee® is used. The gateway device 20 transmits the data received from the sensor device 10 to the higher calculator 41 via the Internet 40. For example, the higher calculator 41 detects whether the monitoring target is abnormal based on the data received through the gateway device 20.

The power source 17 supplies a driving voltage to each of the elements 12, 14, 15, and 16 that constitute the sensor device 10. The sensor device 10 may be configured to operate only with the internal power source 17, without receiving electric power from outside. Thus, for example, the power source 17 is configured to include a solar battery and a storage battery. In this case, the storage battery is charged by electric power generated by the solar battery and each of the elements 12, 14, 15, and 16 of the sensor device 10 is driven by an output voltage from the storage battery.

[Procedure of Data Processing]

As described above, in the sensor network system 1, each sensor device 10 determines a significant section of the time axis based on the detected time-series data, and wirelessly transmits only time-series data of the significant section. Hereinafter, a data processing procedure of each sensor device 10 will be described and a specific example of the data processing will be then described.

Figure 3:
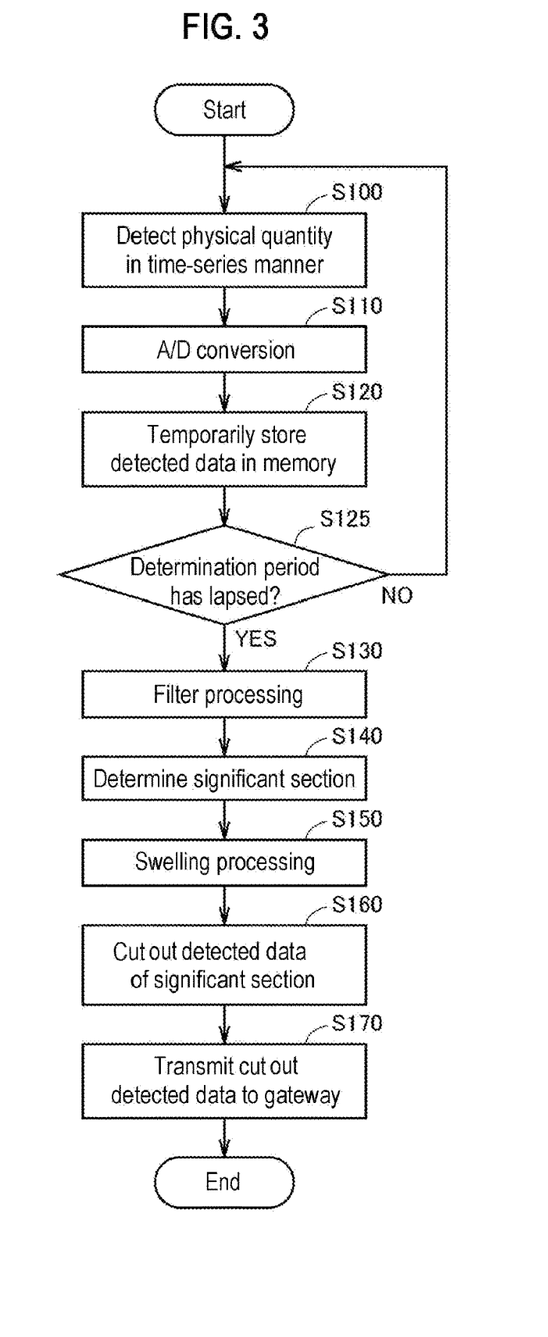
FIG. 3 is a flowchart illustrating a procedure of data processing by the sensor device of FIG. 2.

FIG. 3 is a flowchart illustrating a procedure of the data processing by the sensor device of FIG. 2. Referring to FIGS. 2 and 3, first, a physical quantity of a monitoring target is detected by the sensor element 12 in a time-series manner (step S100). An analog signal of the detected physical quantity is filtered by an analog filter (not shown) and subsequently sampled by an A/D converter (not shown) so as to be converted into digital data (step S110). The CPU 14 temporarily stores the time-series data of the physical quantity in the memory 15 (step S120).

Steps S100, S110, and S120 described above are repeatedly executed until obtaining of time-series data during a target period of threshold value determination (hereinafter, referred to as a "determination period") is completed, namely until a predetermined determination period elapses after detecting of time-series data starts (till YES at step S125). When the determination period has lapsed (YES at step S125), the CPU 14 performs the following data processing on the time-series data detected during the determination period. In parallel with the data processing, time-series data of a next determination period is detected by the sensor element 12 and stored in the memory 15.

In the data processing, first, the CPU 14 performs digital filtering on the time-series data within the determination period to extract time-series data having a component of a predetermined frequency (step S130). The extracted component of the frequency differs in each feature of a monitoring target (for example, which component of the frequency is to be fluctuated in the event of abnormality). Thus, a finite impulse response (FIR) filter, an infinite impulse response (IIR) filter or the like, as well as a low pass filter (LPF), a band pass filter (BPF), or a high pass filter (HPF) are used as a digital filter according to the purpose of data processing.

Next, the CPU 14 determines one or a plurality of significant sections within the determination period by comparing the extracted time-series data having the component of the predetermined frequency with a predetermined threshold value (step S140). The extracted time-series data having the component of the predetermined frequency continuously exceeds the threshold value in each significant section.

Subsequently, the CPU 14 performs processing to extend a time width of each significant section forward and backward, in other words, processing to advance a start point of each significant section and delaying an end point thereof (hereinafter, referred to as "swelling processing") (step S150). In each significant section, the entirety including a portion increased by the swelling processing is handled as one significant section. Further, in a case where a plurality of adjacent significant sections overlap in the swelling processing, the CPU 14 arranges and handles the plurality of adjacent significant sections as a single significant section. By this processing, the number of significant sections in the case of an intensely fluctuated signal can be reduced, resultantly reducing the number of transmission sections of data.

Subsequently, the CPU 14 extracts only data of each significant section from the time-series data detected during the determination period by the sensor element 12 (the time-series data of the significant section is cut out) (step S160). The communication part 16 arranges and transmits only the extracted time-series data of each significant section to the gateway device 20 (step S170). In this case, information indicating the time corresponding to each significant section (for example, information such as a start time, an end time or the like of each significant section) is also output together with the transmission data. Hereinafter, the aforementioned procedure is repeated in each sensor device 10. Further, instead of step S170 described above, the time-series data of each significant section extracted during a plurality of continuous determination periods may be arranged and transmitted to the gateway device 20. This makes it possible to reduce the number of times of communication.

The higher calculator 41 is configured to receive output data from each sensor device 10 by communicating with the plurality of sensor devices 10 via the gateway 20. When data (time-series data of each significant section) is received from any one sensor device 10, the higher calculator 41 stores the received data in the memory. In addition, the higher calculator 41 monitors a monitoring target based on the data received from each of the plurality of sensor devices 10 (for example, the higher calculator 41 determines whether the monitoring target is normal).

Specific Examples of Data Processing

Example 1

Figure 4A:
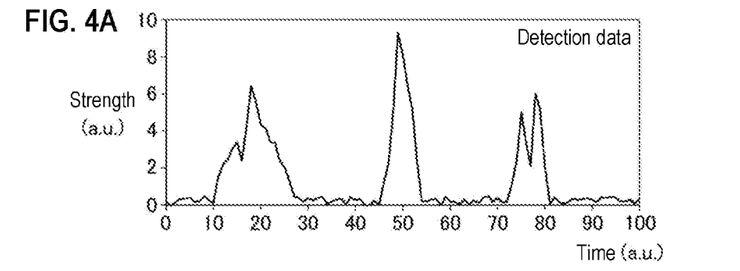
FIGS. 4A to 4D are diagrams illustrating a specific example of the data processing of FIG. 3.
Figure 4B:
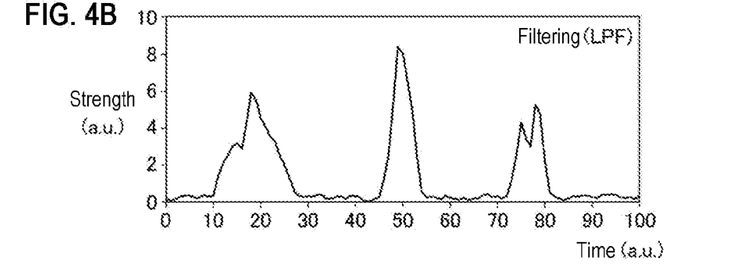

FIGS. 4A to 4B are diagrams illustrating specific examples of the data processing of FIG. 3. In FIGS. 4A to 4B, a case where a fluctuation in signal strength is temporally discrete (in a case where only a noise component is present in other periods of time) is illustrated. Further, in FIGS. 4A to 4B, an example in which swelling processing (step S150 of FIG. 3) is not performed is illustrated. It may be considered that a period of 100 [a.u.] illustrated in FIGS. 4A to 4B corresponds to the determination period mentioned above.

FIG. 4A is a diagram illustrating a waveform of time-series data detected by the sensor element 12. FIG. 4B is a waveform diagram illustrating a result of performing LPF processing on the time-series data illustrated in FIG. 4A.

Figure 4C:
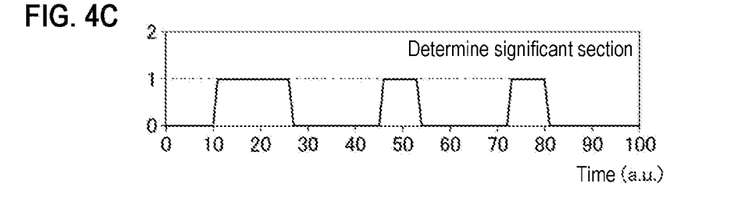

FIG. 4C is a diagram illustrating a waveform (hereinafter, also referred to as a "communication window waveform") representing a significant section. The significant section is obtained by comparing the time-series data after performing the LPF processing illustrated in FIG. 4B with a threshold value. In FIG. 4C, a section in which a value of the communication window waveform is "1" represents a significant section, and a section in which a value of the communication window waveform is "0" represents a non-significant section.

Figure 4D:
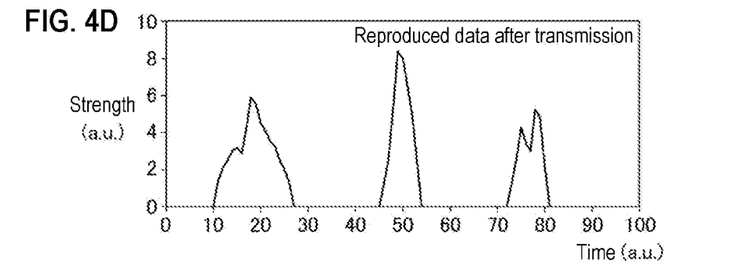

Data transmitted from the sensor device 10 to the higher calculator 41 is obtained by extracting data of only the significant section having the communication window waveform illustrated in FIG. 4C from the time-series data of FIG. 4A. FIG. 4D is a waveform diagram illustrating data reproduced by the higher calculator 41. In FIG. 4D, in the non-significant section (the section in which the communication window waveform is 0), the time-series data is not output to the outside from the sensor device 10. When compared with the time-series data of FIG. 4A, it can be seen that portions of reproduced data of FIG. 4D where the signal strength is small have been deleted.

Figure 5A:
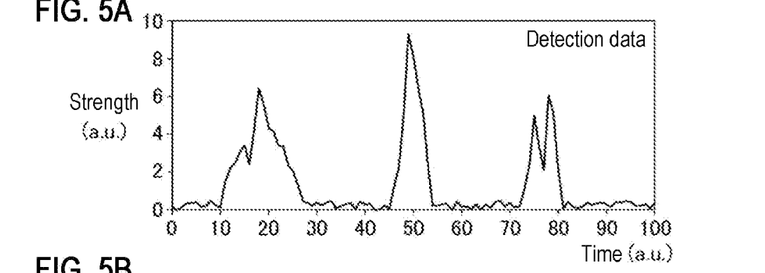
FIGS. 5A to 5E are diagrams illustrating a modification of the data processing illustrated in FIGS. 4A to 4D.
Figure 5B:
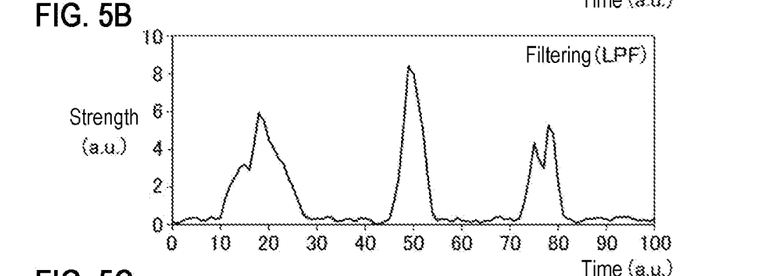
Figure 5C:
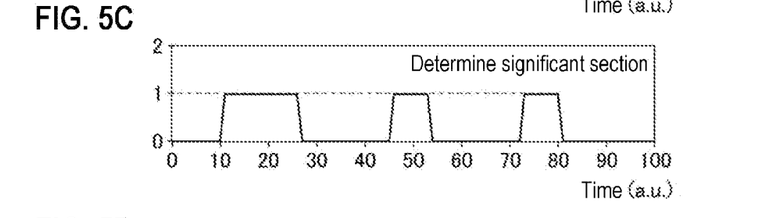

FIGS. 5A to 5E are diagrams illustrating a modification of the data processing illustrated in FIGS. 4A to 4D. In FIGS. 5A to 5E, an example in which the swelling processing is included in the data processing of FIGS. 4A to 4D. FIGS. 5A to 5C are similar to FIGS. 4A to 4C, and thus, descriptions thereof will be not repeated.

Figure 5D:
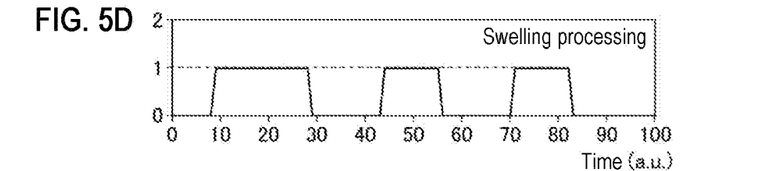

FIG. 5D is a diagram illustrating an example in which swelling processing was performed on a communication window waveform illustrated in FIG. 5C by a predetermined extension width. It can be seen that, a section (significant section) in which a waveform value is "1" extends in the communication window waveform after the swelling processing illustrated in FIG. 5D, compared with the communication window waveform before the swelling processing illustrated in FIG. 5C.

Figure 5E:
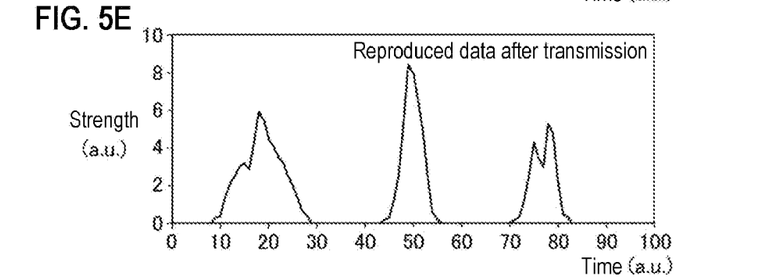

Data transmitted from the sensor device 10 to the higher calculator 41 is obtained by extracting data of only the significant section having the communication window waveform illustrated in FIG. 5D from the time-series data of FIG. 5A. FIG. 5E is a waveform diagram illustrating data reproduced by the higher calculator 41. When compared with the waveform diagram of reproduced data illustrated in FIG. 4D, the generated data of FIG. 5E can be restored in the entire waveform by the swelling processing. In the case of FIG. 5E, a data compression rate of the original time-series data of FIG. 5A is 45%.

FIGS. 6A to 6E are diagrams illustrating a modification of the data processing illustrated in FIGS. 5A to 5E. In FIGS. 6A to 6E, an example of performing BPF processing instead of the LPF processing is illustrated.

Figure 6A:
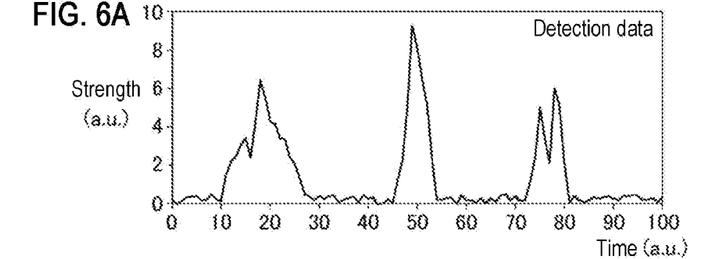
FIGS. 6A to 6E are diagrams illustrating a modification of the data processing illustrated in FIG. 5A to 5E.
Figure 6B:
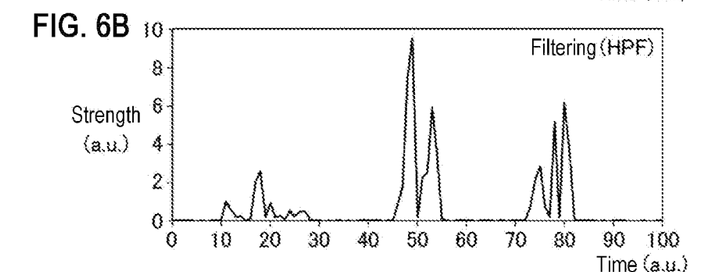

FIG. 6A illustrates a waveform of time-series data detected by the sensor element 12, which is similar to the case of FIG. 5A. FIG. 6B is a waveform diagram illustrating a result of performing the BPF processing on the time-series data of FIG. 6A.

Figure 6C:
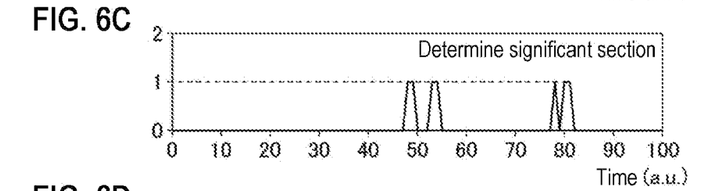

FIG. 6C is a diagram illustrating a waveform (a communication window waveform) representing a significant section. The significant section is obtained by comparing the time-series data after the BPF processing illustrated in FIG. 6B with a threshold value. In FIG. 6C, a section in which a value of the communication window waveform is "1" represents a significant section, and a section in which a value of the communication window waveform is "0" represents a non-significant section.

Figure 6D:
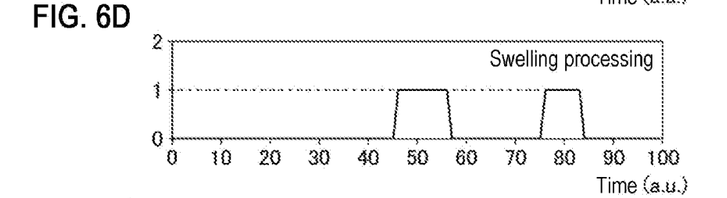

FIG. 6D is a diagram illustrating an example in which the swelling processing was performed on the communication window waveform illustrated in FIG. 6C by a predetermined extension width. In the case of FIG. 6D, since communication windows (significant sections) after the swelling processing overlap, the adjacent two communication windows are grouped into one communication window. In this manner, through the swelling processing, it is possible to prevent the number of significant sections from being inadvertently increased and to suppress a reduction in compression rate due to an increase in time information added to each extracted significant section. In addition, although the number of significant sections is increased, since the swelling processing is simultaneously performed on communication by the aforementioned determination period or a greater period, there is no occurrence of a phenomenon such as transmission with high frequency or the like, without a change in communication frequency due to a signal and a determination result.

Figure 6E:
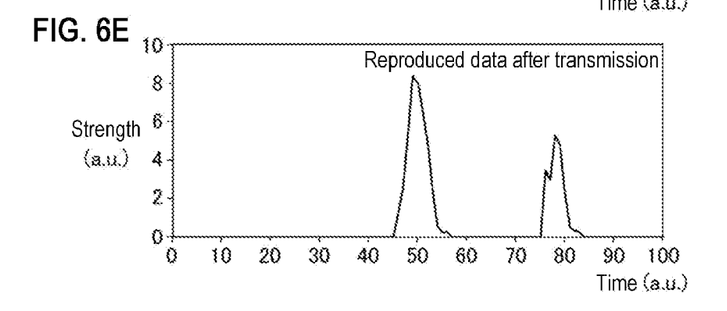

Data transmitted from the sensor device 10 to the higher calculator 41 is obtained by extracting data of only the significant section having the communication window waveform illustrated in FIG. 6D from the time-series data of FIG. 6A. FIG. 6E is a waveform diagram illustrating data reproduced by the higher calculator 41.

Example 2

Figure 7A:
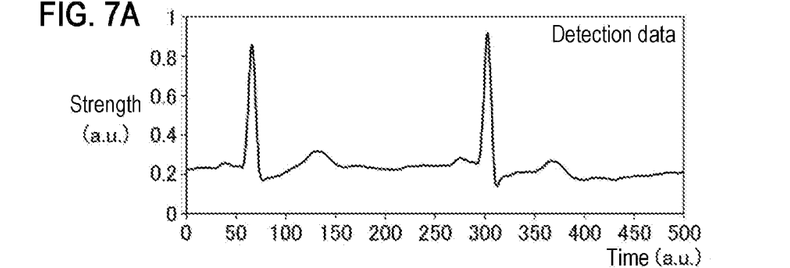
FIGS. 7A to 7E are diagrams illustrating another specific example of the data processing of FIG. 3.

FIGS. 7A to 7E are diagrams illustrating another specific example of the data processing of FIG. 3. It may be considered that a period of 500 [a.u.] illustrated in FIGS. 7A to 7E corresponds to the determination period mentioned above. In FIG. 7A, an example of time-series data in a case where signal strength is continuously fluctuated is illustrated. Specifically, in this example, a waveform diagram of heartbeat is illustrated. A waveform of heartbeat is a continuously fluctuated waveform including various elements such as a P wave, a Q wave, an R wave, an S wave, a T wave, and a U wave.

Figure 7B:
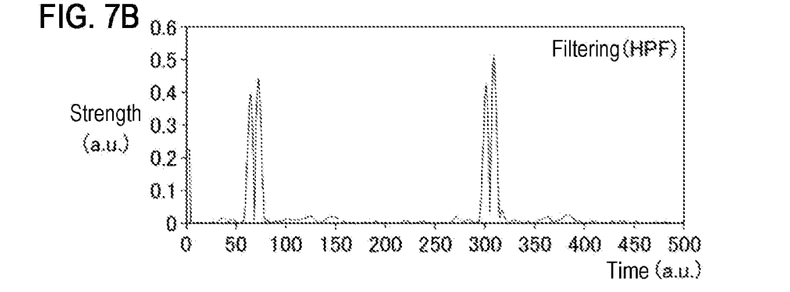

FIG. 7B is a waveform diagram illustrating a result of performing HPF processing on the time-series data of FIG. 7A.

Figure 7C:
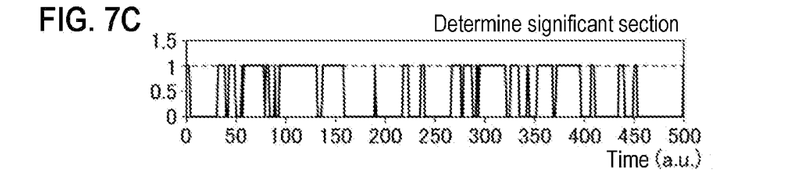

FIG. 7C is a diagram illustrating a waveform (a communication window waveform) representing a significant section. The significant section is obtained by comparing the time-series data after the HPF processing illustrated in FIG. 7B with a threshold value. In FIG. 7C, a section in which a value of the communication window waveform is "1" represents a significant section, and a section in which a value of the communication window waveform is "0" represents a non-significant section.

Figure 7D:
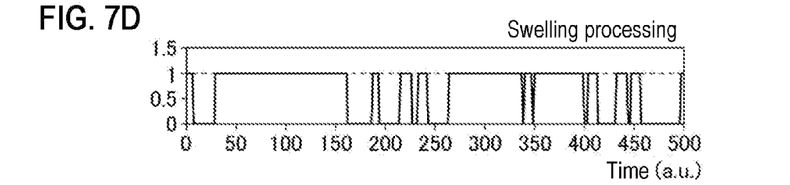

FIG. 7D is a diagram illustrating an example in which the swelling processing was performed on the communication window waveform illustrated in FIG. 7C by a predetermined extension width. In FIG. 7D, in a case where a plurality of communication windows after the swelling processing overlap, a plurality of adjacent communication windows are grouped into one communication window.

Data transmitted from the sensor device 10 to the higher calculator 41 is obtained by extracting data of only the significant section having the communication window waveform illustrated in FIG. 7D from the time-series data of FIG. 7A. Data of a non-significant section is not output to the outside from the sensor device 10.

Figure 7E:
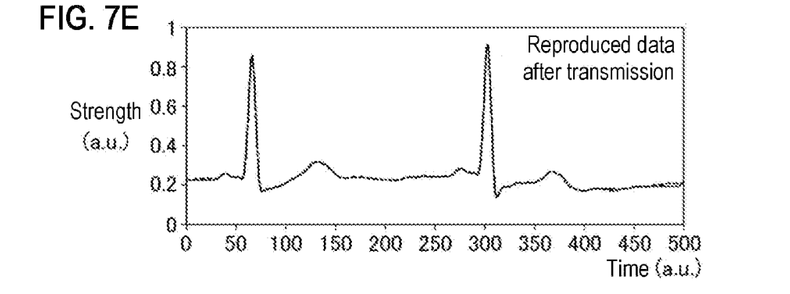

FIG. 7E is a waveform diagram illustrating data reproduced by the higher calculator 41. In each non-significant section, in this example, a final data value of an immediately previous significant section is maintained as it is, but interpolation may be performed by linear interpolation or the like. In FIG. 7E, the dotted line represents a waveform of the original time-series data of FIG. 7A. In the case of FIG. 7E, a data compression rate of the original time-series data illustrated in FIG. 7A is 74%. An effect of suppressing a data amount, without losing the characteristics of a portion of the original time-series data where a signal is severely fluctuated, is achieved.

Figure 8A:
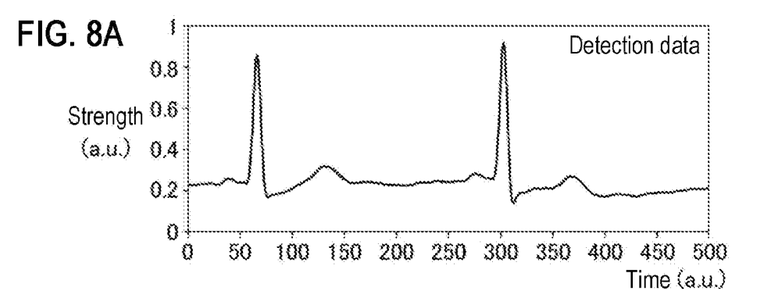
FIGS. 8A to 8E are diagrams illustrating a modification of the data processing illustrated in FIGS. 7A to 7E.
Figure 8B:
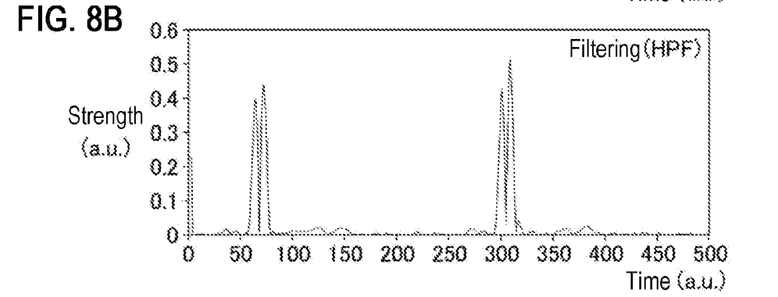

FIGS. 8A to 8E are diagrams illustrating a modification of the data processing illustrated in FIGS. 7A to 7E. In the example of FIGS. 8A to 8E, a threshold value when a significant section is determined is greater than that of the case of FIGS. 7A to 7E. FIGS. 8A and 8B are similar to FIGS. 7A and 7B, and thus, descriptions thereof will be not repeated.

Figure 8C:
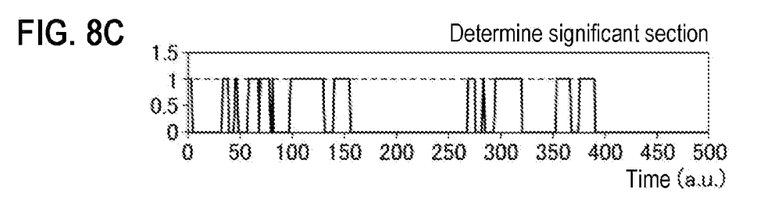

FIG. 8C is a diagram illustrating a waveform (communication window waveform) representing a significant section. Since a threshold value greater than that of FIG. 7C is used, a total number of significant sections and a time width of each significant section are smaller than those of the case of FIG. 7C.

Figure 8D:
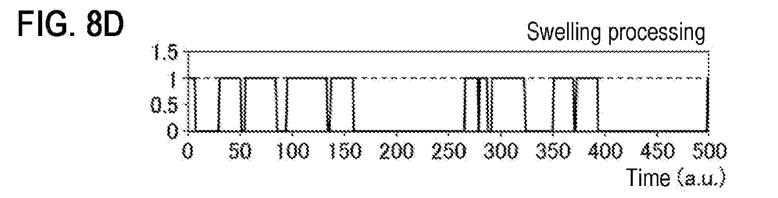

FIG. 8D is a diagram illustrating an example in which the swelling processing was performed on the communication window waveform illustrated in FIG. 8C by a predetermined extension width. In FIG. 8D, in a case where a plurality of communication windows after the swelling processing overlap, a plurality of adjacent communication windows are grouped into one communication window.

Data transmitted from the sensor device 10 to the higher calculator 41 is obtained by extracting data of only the significant section having the communication window waveform illustrated in FIG. 8D from the time-series data of FIG. 8A. Data of a non-significant section is not output to the outside from the sensor device 10.

Figure 8E:
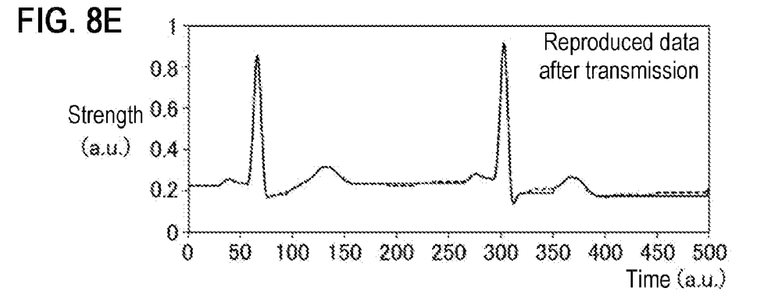

FIG. 8E is a waveform diagram illustrating data reproduced by the higher calculator 41. In each non-significant section, in this example, a final data value of an immediately previous significant section is maintained as it is, but interpolation may be performed by linear interpolation or the like. In FIG. 8E, the dotted line represents a waveform of the original time-series data of FIG. 8A. In the case of FIG. 8E, a data compression rate of the original time-series data illustrated in FIG. 8A is 52%. The data compression rate is smaller (a compression degree is greater) than that of the case of FIG. 7E, and a reproduction situation is degraded, as compared with FIG. 7E, but the sketch of the original time-series data can be reproduced.

In the case of the above example 1, that is, in a case where the fluctuating portion of the signal discretely occurs, if data is obtained at a sampling rate matched to the discretely occurred fluctuating portion of signal strength, a data amount may become enormous. If the sampling rate is lowered in order to reduce the data amount, fine fluctuation is not acquired and the accuracy of data is sacrificed. Meanwhile, in the case of the present embodiment, it is possible to suppress the amount of communication data and also to accurately obtain data of a portion corresponding to a required frequency region. The lower the occurrence rate of significant signals, the greater data compression effect is achieved.

Further, even in a case where the signal strength continuously fluctuates as in the above example 2, according to the present embodiment, it is possible to compress the amount of data to be transmitted without losing the characteristics of the portion where the signal fluctuates.

Second Embodiment

In the second embodiment, a method of determining a significant section is different from that of the case of the first embodiment. A configuration of a sensor network and a hardware configuration of a sensor device are substantially the same as those of the case of the first embodiment, and thus, a description thereof will be not repeated. Further, similar to the case of the first embodiment, swelling processing may be performed on each determined significant section.

[Outline of Data Processing]

Figure 9:
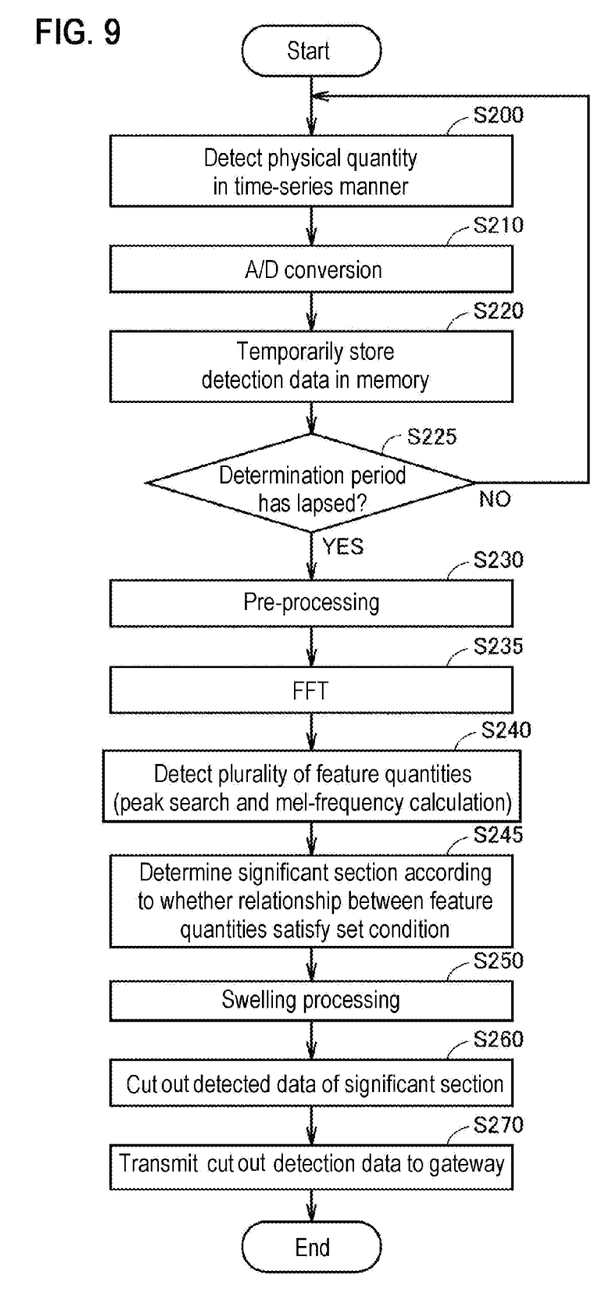
FIG. 9 is a flowchart illustrating a procedure of data processing by each sensor device in a sensor network of the embodiment of FIG. 2.

FIG. 9 is a flowchart illustrating a data processing procedure by each sensor device in a sensor network of the second embodiment. The processes at steps S200, S210, S220, S225, S250, S260, and S270 in FIG. 9 are substantially the same as that the process in the steps S100, S110, S120, S125, S150, S160 and S170 in FIG. 3, and thus, a description thereof will be not repeated.

The processing at steps S230, S235, and S240 of FIG. 9 corresponds to the filtering at step S130 of FIG. 3. At these steps of FIG. 9, instead of the filtering, the original time-series data is Fourier-transformed and a plurality of feature quantities representing features of an obtained spectrum are extracted. Further, the processing of step S245 of FIG. 9 corresponds to that of step S140 of FIG. 3, and one or a plurality of significant sections are determined within a determination period by determining whether the relationship between the plurality of feature quantities satisfies a predetermined reference. Hereinafter, the processing at each of the steps will be described in detail with reference to FIGS. 2 and 9.

[Pre-Processing and FFT]

First, the CPU 14 performs pre-processing on time-series data detected by the sensor element 12 within a determination period (step S230), and subsequently performs Fourier transformation thereon (step 235). As the Fourier transformation, fast Fourier transformation (FFT) is used.

Specifically, the pre-processing includes window processing. The window processing is processing of multiplying the time-series data by a window function in order to cut out N number of time-series data to be subjected to FFT. As the window function, for example, a rectangular window, a hanning window, a hamming window, a Blackman window, or the like is used. A target section of FFT cut out by the window processing is generally referred to as a "frame". In addition to the pre-processing, low pass or band pass by a digital filter and frequency domain emphasis using a pre-emphasis filter may also be performed.

The CPU 14 sequentially cut out the time-series data within the determination period while shifting a position of a frame little by little, and performs FFT thereon. For example, when a sampling period of the time-series data is Ts[sec.], the CPU 14 performs FFT on N number of time-series data obtained up to a current time at every m×Ts (where m is an integer satisfying $1 \leq m \leq N$). A Fourier spectrum as a result of FFT includes an amplitude spectrum and a phase spectrum. A power spectrum may be counted.

[Calculation of Feature Quantity]

Subsequently, the CPU 14 obtains a plurality of feature quantities representing features of the spectrum obtained by FFT for each frame (step S240). Hereinafter, a specific example of the feature quantity will be described.

(1. Dominant Frequency and/or Peak Value)

Figure 10:
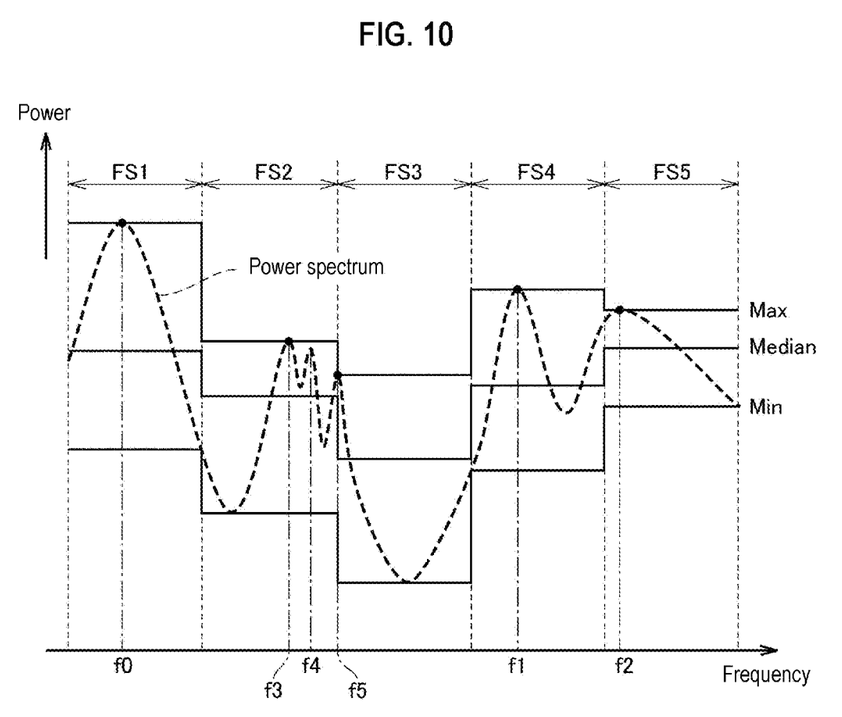
FIG. 10 is a diagram illustrating an example of a power spectrum.

FIG. 10 is a view illustrating an example of a power spectrum. Here, an amplitude spectrum may also be used instead of the power spectrum. A feature of a shape of such a spectrum may be used as a feature quantity.

Specifically, in the power spectrum of FIG. 10, six local peaks (maximum points) are illustrated. Frequencies giving these peak values are referred to as dominant frequencies f0 to f5. Here, the orders are given to the dominant frequencies in order, starting from the highest peak value corresponding thereto. The dominant frequency and/or peak value up to a predetermined order (about $10^{th}$ order) including a $0^{th}$ dominant frequency f0 may be used as a feature quantity.

(2. Statistic of Each Frequency Section)

A frequency space may be divided at equal intervals or a logarithmic space of a frequency may be divided at equal intervals to generate a plurality of frequency sections, and a statistic amount of each of the generated frequency sections may be used as a feature quantity. For example, in the case of FIG. 10, the frequency space is divided into a plurality of sections FS1 to FS5 at equal intervals, and a maximum value Max, a minimum value Min, and a median value Median are extracted as feature quantities of each of the frequency sections. An average may be used instead of the median value. Normally, an arithmetic average is used as an average value, but in a case where the logarithm is appropriate for expressing an amplitude of a signal, a geometric mean may also be used as the average. Further, in this case, a frequency sequence corresponding to the maximum value, the minimum value, and the median value of each frequency section may also be used as a feature quantity, and the maximum value, the minimum value, the median value and the frequency corresponding to each of the values may also be used as a feature quantity. In addition, a calculation value of a multi-band pass filter obtained by dividing a frequency space at equal intervals may also be used as a calculation that can obtain the same result. Further, a coefficient sequence based on 1/n octave analysis (multi-band pass at equal intervals in a logarithmic space) obtained by equally dividing a frequency space may be used.

(3. Mel-Frequency Cepstrum Coefficient Sequence)

In the case of voice data or the like, a Mel-frequency cepstrum coefficients (MFCC) sequence may be extracted as a feature quantity. The MFCC is effective when analysis is performed on time-series data to match human's sensation (in the case of having importance on low frequency vibration).

In calculating an MFCC, data is compressed by multiplying power spectrum data or amplitude spectrum data by Mel-filter bank. The Mel-filter bank is an array of band pass filters and includes about 20 divided filters on a frequency axis. Frequency widths of the filters are different, and dense like low frequency (narrow in frequency width) or coarse like high frequency (wide in frequency width) according to a psychological scale of auditory property. Spectrum data compressed by multiplication of the Mel-filter bank is logarithmically processed and subsequently discrete-cosine-transformed. A low-order component of cepstrum obtained through the discrete cosine transform is an MFCC.

[Determination of Significant Section]

Subsequently, referring back to FIG. 9, one or a plurality of significant sections are determined during a determination period by determining whether the relationship between the plurality of feature quantities satisfies a predetermined reference (step S245). One or a plurality of time frames (windows in the pre-processing (step S230)) correspond to each of the significant sections, and a plurality of feature quantities calculated in each of corresponding time frames satisfy the aforementioned reference.

For example, in a case where a plurality of peak values ($a_0$, $a_1$, $a_2$, $a_3$, . . . ) of a spectrum are used as feature quantities, when a determination condition for the peak values ($a_k$, where k=1, 2, 3, . . . ) is set and the determination condition is met, it is determined that a corresponding time frame is included in the significant section. As the determination condition, a magnitude relationship between each peak value or the coefficient $a_k$ and a predetermined threshold value, a magnitude relationship between a standardized peak value or a coefficient ($a_k/a_i$, k≠i) and the predetermined threshold value, or their composite condition is used.

Figure 11A:
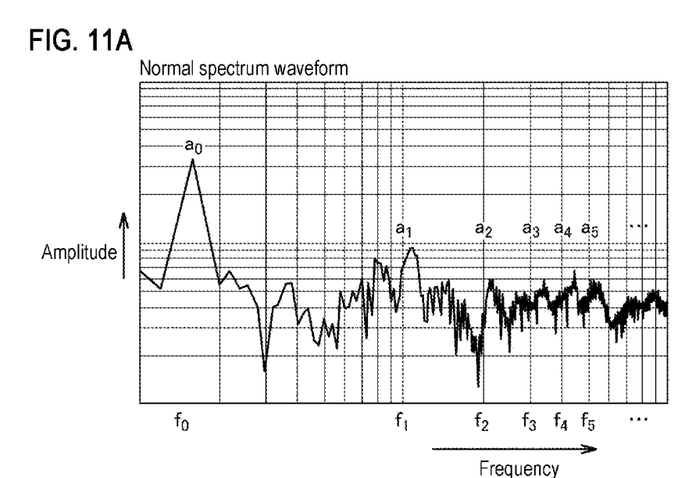
FIGS. 11A and 11B are diagrams illustrating a determination of a significant section in a second embodiment.
Figure 11B:
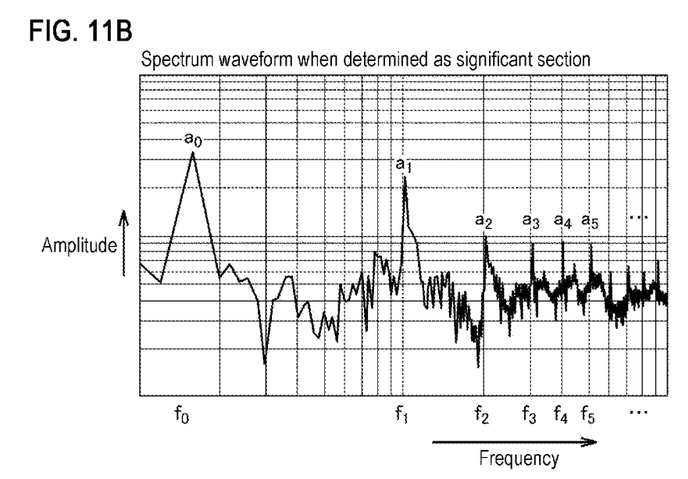

FIGS. 11A and B are diagrams illustrating determination of a significant section in the second embodiment. In FIGS. 11A and 11B, a determination condition of a significant section is that a ratio of a major amplitude $a_0$ to an amplitude $a_2$ at a frequency $f_2$ (the relationship between the frequency $f_2$ and a frequency $f_0$ is already known) at which a characteristic peak may be generated is a predetermined threshold value or more. When this determination condition is met, a corresponding time frame is determined to be included in a significant section. FIG. 11A illustrates a normal waveform of a spectrum when it is determined that the time frame is not included in the significant section, and FIG. 11B illustrates a waveform of a spectrum when it is determined that the time frame is included in a significant section. In FIG. 11B, the magnitude of the amplitude $a_2$ at a frequency $f_2$ is increased, as compared with the case of FIG. 11A.

According to the present embodiment, since a significant section is determined based on a relationship between a plurality of feature quantities in the Fourier spectrum of the time-series data detected by the sensor element, for example, it is possible to accurately extract only time-series data of a period required to determine whether a monitoring target is abnormal. As a result, it is possible to extract an event difficult to apply a simple determination of a threshold value of time-series data (mainly based on the presence and absence of a signal), and for example, it is possible to detect only a change in a vibration situation with high sensitivity, in a vibration target difficult to discriminate through only monitoring of time-series waveform with constant vibrations.

According to some embodiments of the present disclosure, it is possible to reduce an amount of data wirelessly transmitted from a sensor device in a sensor network.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A sensor device, comprising:
   a sensor element configured to detect a physical quantity in a time-series manner;
   a data processing part configured to:
      perform filtering on time-series data detected during a predetermined period by the sensor element to extract time-series data having a component of a predetermined frequency;
      compare the extracted time-series data with a predetermined threshold value to determine one or a plurality of significant sections within the predetermined period, the extracted time-series data exceeding the threshold value in each of the significant sections; and
      extend a time width of each of the significant sections by advancing a start point of each of the significant sections and delaying an end point of each of the significant sections; and
   a communication part configured to:
      arrange and wirelessly transmit time-series data of each of the significant sections among the time-series data detected during the predetermined period by the sensor element; and
      wirelessly transmit the time-series data of each of the significant sections using the entirety including a portion increased by extending the time width for each of the significant sections as one significant section.

2. A sensor device, comprising:
   a sensor element configured to detect a physical quantity in a time-series manner;
   a data processing part configured to:
      Fourier-transform time-series data detected during a predetermined period by the sensor element for each set time frame to extract a plurality of feature quantities representing features of an obtained spectrum;
      determine whether a relationship between the plurality of feature quantities satisfies a predetermined reference to determine one or a plurality of significant sections within the predetermined period; and
      extend a time width of each of the significant sections by advancing a start point of each of the significant sections and delaying an end point of each of the significant sections; and
   a communication part configured to:
      arrange and wirelessly transmit time-series data of each of the significant sections among the time-series data detected during the predetermined period by the sensor element; and
      wirelessly transmit the time-series data of each of the significant sections using the entirety including a portion increased by extending the time width for each of the significant sections as one significant section,
   wherein the relationship between the plurality of feature quantities satisfies the reference in each of one or plurality of time frames corresponding to each of the significant sections.

3. The sensor device of claim 1, wherein when a plurality of adjacent significant sections obtained by extending the time width of each of the significant sections overlap, the data processing part is further configured to arrange the plurality of adjacent significant sections and handle the same as one significant section.

4. The sensor device of claim 3, wherein the communication part is further configured to arrange and wirelessly transmit the time-series data of each of the significant sections together with information representing a time corresponding to each of the significant sections.

5. A sensor network system, comprising:
   a plurality of sensor devices including the sensor device of claim 1; and
   a gateway device configured to wirelessly communicate with each of the sensor devices.

6. A data compressing method, comprising
performing, by a processor, filtering on time-series data detected during a predetermined period by a sensor element to extract time-series data having a component of a predetermined frequency;
comparing, by the processor, the extracted time-series data with a predetermined threshold value to determine one or a plurality of significant sections within the predetermined period, the extracted time-series data exceeding the threshold value in each of the significant sections;
extending, by the processor, a time width of each of the significant sections by advancing a start point of each of the significant sections and delaying an end point of each of the significant sections;
extracting, by the processor, only time-series data of each of the significant sections among the time-series data detected during the predetermined period by the sensor element; and
wirelessly transmitting, by a communication part, the time-series data of each of the significant sections using the entirety including a portion increased by extending the time width for each of the significant sections as one significant section.

* * * * *